(12) United States Patent
Park et al.

(10) Patent No.: US 11,239,989 B2
(45) Date of Patent: Feb. 1, 2022

(54) IN-VEHICLE COMMUNICATION DEVICE AND TIME SYNCHRONIZATION METHOD THEREOF

(71) Applicants: HYUNDAI MOTOR COMPANY, Seoul (KR); KIA MOTORS CORPORATION, Seoul (KR)

(72) Inventors: Tae Hwan Park, Seoul (KR); Ha Rin Lee, Seoul (KR); Beom Sik Kim, Hwaseong-si (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 0 days.

(21) Appl. No.: 16/801,471

(22) Filed: Feb. 26, 2020

(65) Prior Publication Data

US 2021/0067311 A1 Mar. 4, 2021

(30) Foreign Application Priority Data

Aug. 30, 2019 (KR) .................. 10-2019-0107433

(51) Int. Cl.
*H04L 7/00* (2006.01)
*H04L 12/40* (2006.01)

(52) U.S. Cl.
CPC ...... *H04L 7/0041* (2013.01); *H04L 12/40013* (2013.01); *H04L 12/40032* (2013.01); *H04L 2012/40273* (2013.01)

(58) Field of Classification Search
CPC ............ H04L 7/0041; H04L 12/40013; H04L 12/40032; H04L 2012/40273
See application file for complete search history.

(56) References Cited

U.S. PATENT DOCUMENTS

| 5,801,695 | A | * | 9/1998 | Townshend | ........... | H04L 5/1438 |
| | | | | | | 375/340 |
| 5,900,755 | A | * | 5/1999 | Toeppen | .................. | H03L 7/189 |
| | | | | | | 327/163 |
| 6,249,526 | B1 | * | 6/2001 | Loukianov | ............ | H04J 3/1694 |
| | | | | | | 348/E7.073 |
| 7,084,898 | B1 | * | 8/2006 | Firestone | ............... | H04N 7/152 |
| | | | | | | 348/14.08 |
| 2003/0003912 | A1 | * | 1/2003 | Melpignano | ...... | H04W 36/0055 |
| | | | | | | 455/436 |
| 2004/0139238 | A1 | * | 7/2004 | Luhrs | ...................... | H04L 12/66 |
| | | | | | | 710/1 |

(Continued)

*Primary Examiner* — Ayaz R Sheikh
*Assistant Examiner* — Tarell A Hampton
(74) *Attorney, Agent, or Firm* — McDonnell Boehnen Hulbert & Berghoff LLP

(57) ABSTRACT

The present disclosure relates to an in-vehicle communication device and a time synchronization method thereof. The in-vehicle communication device includes a clock generator for generating a clock signal, a local counter for counting the number of pulses of the clock signal, a transceiver for receiving a message via an in-vehicle communication network, and a processor that determines whether the message received via the transceiver is a synchronization message, extracts synchronization time information from the synchronization message, and adjusts a count value of the local counter based on the synchronization time information to perform time synchronization.

10 Claims, 4 Drawing Sheets

(56) References Cited

U.S. PATENT DOCUMENTS

| | | | |
|---|---|---|---|
| 2005/0141565 A1* | 6/2005 | Forest | H03M 13/43 370/503 |
| 2005/0251701 A1* | 11/2005 | Fredriksson | H04L 43/00 713/500 |
| 2005/0254518 A1* | 11/2005 | Fujimori | H04L 69/08 370/466 |
| 2019/0222407 A1* | 7/2019 | Yoshida | H04L 7/0037 |

* cited by examiner

IN-VEHICLE COMMUNICATION DEVICE AND TIME SYNCHRONIZATION METHOD THEREOF

CROSS REFERENCE TO RELATED APPLICATION

This application claims the benefit of priority to Korean Patent Application No. 10-2019-0107433, filed in the Korean Intellectual Property Office on Aug. 30, 2019, the entire contents of which are incorporated herein by reference.

TECHNICAL FIELD

The present disclosure relates to an in-vehicle communication device and a time synchronization method thereof.

BACKGROUND

In general, a controller area network (CAN) has been used for communication between electronic control units (ECUs) in a vehicle. In other words, nodes (ECUs) connected to the CAN may exchange data and/or information with each other. Each node is composed of a CAN transceiver, a CAN controller, and a central processing unit (CPU).

In an advanced driver assistance system (ADAS) in which a plurality of sensor information are processed in a complex manner, time information synchronization of each sensor information is very important. A controller performance and a communication scheme are different for each sensor, so that when sensor data are integrally processed, integrated processing should be done based on generation time information of each sensor data. Thus, the sensors synchronize the time information thereof with each other and then transmit the synchronized time information together with the sensor data.

Ethernet communication uses a protocol and hardware (H/W) such as IEEE 1588 for the time synchronization between the sensors. However, in CAN communication, there may be no separate hardware configuration for the time synchronization of the sensors, and CAN communication time synchronization may be performed by a software (S/W) function in the CPU.

Conventionally, when a synchronization message including synchronization time information is received, the CAN controller performs the time synchronization by reflecting the synchronization time information in absolute time information of the CAN node. However, a delay caused by transmitting the synchronization time information during the time synchronization and a delay caused by the time synchronization processing of the CAN node may cause an error in the time synchronization between the CAN nodes.

In addition, conventionally, as time setting is performed by software, a large error may occur between the set time and the synchronization time. Statistically, an error value may be measured and corrected, but it is difficult to easily correct the error due to the fluctuations in a CAN communication delay time and a software operation time as the vehicle travels.

SUMMARY

The present disclosure has been made to solve the above-mentioned problems occurring in the prior art while advantages achieved by the prior art are maintained intact.

An aspect of the present disclosure provides an in-vehicle communication device that performs hardware-based time synchronization and a time synchronization method thereof.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, an in-vehicle communication device includes a clock generator for generating a clock signal, a local counter for counting the number of pulses of the clock signal, a transceiver for receiving a message via an in-vehicle communication network, and a processor that determines whether the message received via the transceiver is a synchronization message, extracts synchronization time information from the synchronization message, and adjusts a count value of the local counter based on the synchronization time information to perform time synchronization.

In one embodiment, the in-vehicle communication network may be implemented as a controller area network (CAN) or a Local Interconnect Network (LIN).

In one embodiment, the processor may include a CAN controller, an offset processor, and a scaler.

In one embodiment, the CAN controller may filter the synchronization message among the received messages through a filter.

In one embodiment, the filter may determine whether a message identifier of the received message matches a pre-stored synchronization message identifier.

In one embodiment, the offset processor may offset the synchronization time information by reflecting communication delay information.

In one embodiment, the offset processor may calculate an offset synchronization time by adding a synchronization time and a communication delay time.

In one embodiment, the scaler may scale the offset synchronization time based on a driving frequency of the local counter.

In one embodiment, the scaler may calculate a scaled count value by performing a multiplication operation of the offset synchronization time and the driving frequency.

In one embodiment, the scaler may reflect the scaled count value to the local counter.

In one embodiment, the local counter may update a current count value into the scaled count value.

In one embodiment, the in-vehicle communication device may further include at least one of sensors and a host processor that, when sensor information is acquired through the at least one of sensors, identifies acquisition time information of the sensor information based on a synchronized count value output from the local counter, and generates a transmission message including the sensor information and the acquisition time information and provide the generated transmission message to the processor.

According to another aspect of the present disclosure, a method for synchronizing time of an in-vehicle communication device includes receiving, by a processor, a message via an in-vehicle communication network, determining, by the processor, whether the received message is a synchronization message, extracting, by the processor, synchronization time information from the synchronization message, and performing, by the processor, time synchronization based on the synchronization time information.

In one embodiment, the in-vehicle communication network may be implemented as a controller area network (CAN) or a Local Interconnect Network (LIN).

In one embodiment, the determining of whether the received message is the synchronization message may include determining, by a CAN controller of the processor, whether a message identifier of the received message matches a pre-stored synchronization message identifier and filtering the synchronization message among the received messages.

In one embodiment, the performing of the time synchronization may include offsetting, by an offset processor of the processor, the synchronization time information by reflecting communication delay information, scaling, by a scaler of the processor, the offset synchronization time information based on a driving frequency of a local counter, and reflecting, by the scaler, a scaled count value to the local counter.

In one embodiment, the offsetting of the synchronization time information may include calculating, by the offset processor, an offset synchronization time by adding a synchronization time and a communication delay time.

In one embodiment, the scaling of the offset synchronization time information may include calculating, by the scaler, a scaled count value by performing a multiplication operation of the offset synchronization time and the driving frequency.

In one embodiment, the reflecting of the scaled count value to the local counter may include updating, by the local counter, a current count value into the scaled count value.

BRIEF DESCRIPTION OF THE FIGURES

The above and other objects, features and advantages of the present disclosure will be more apparent from the following detailed description taken in conjunction with the accompanying drawings.

DETAILED DESCRIPTION

Figure 1:
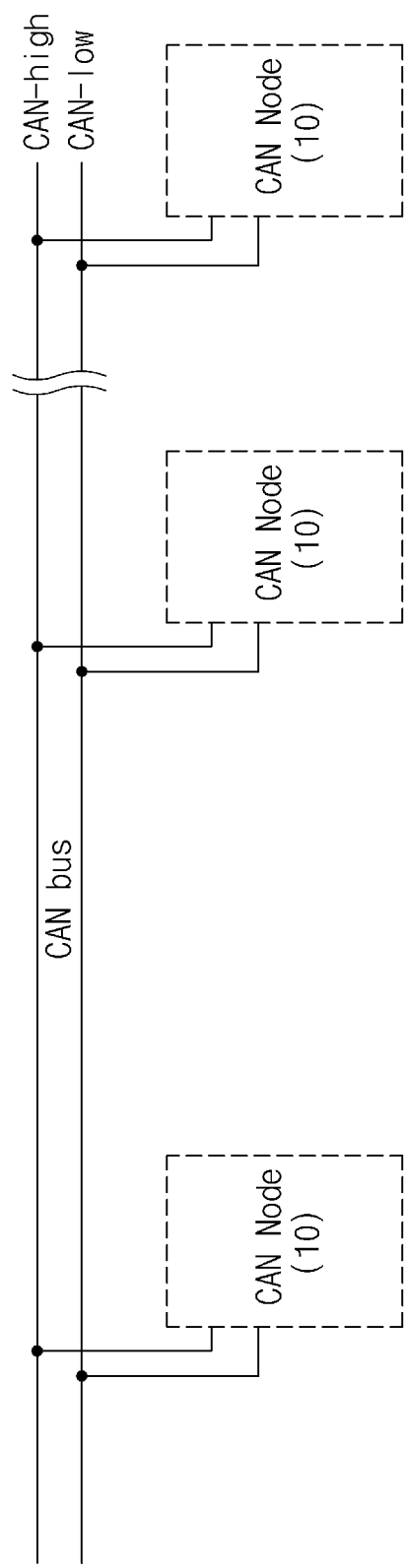
FIG. 1 is a schematic diagram illustrating a CAN communication system related to the present disclosure.

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of the related known configuration or function will be omitted when it is determined that it interferes with the understanding of the embodiment of the present disclosure.

In describing the components of the embodiment according to the present disclosure, terms such as first, second, A, B, (a), (b), and the like may be used. These terms are merely intended to distinguish the components from other components, and the terms do not limit the nature, order or sequence of the components. Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Absolute time information at a time of acquiring sensor information is transmitted together with the sensor information, so that even when data transmission is delayed due to CAN communication delay, a receiver may identify the acquisition time of the sensor information and synchronize the acquisition time of the sensor information with time information of other sensors to utilize the sensor information.

The present disclosure proposes a technique for performing time synchronization for data communication between electric control units (ECUs) connected to a controller area network (CAN). However, without being limited thereto, the technique may be applied to the time synchronization for data communication between ECUs connected via a Local Interconnect Network (LIN), or the like.

FIG. 1 is a schematic diagram illustrating a CAN communication system related to the present disclosure.

Referring to FIG. 1, the CAN communication system includes at least two CAN nodes 10 connected to a CAN bus. In this connection, the CAN bus is a transmission path of data, and includes two stranded data wires, that is, a CAN low wire and a CAN high wire. The CAN node 10 may be implemented as an electronic control unit (ECU) mounted on a vehicle. In other words, the CAN node 10 is an in-vehicle communication device capable of CAN communication.

Figure 2:
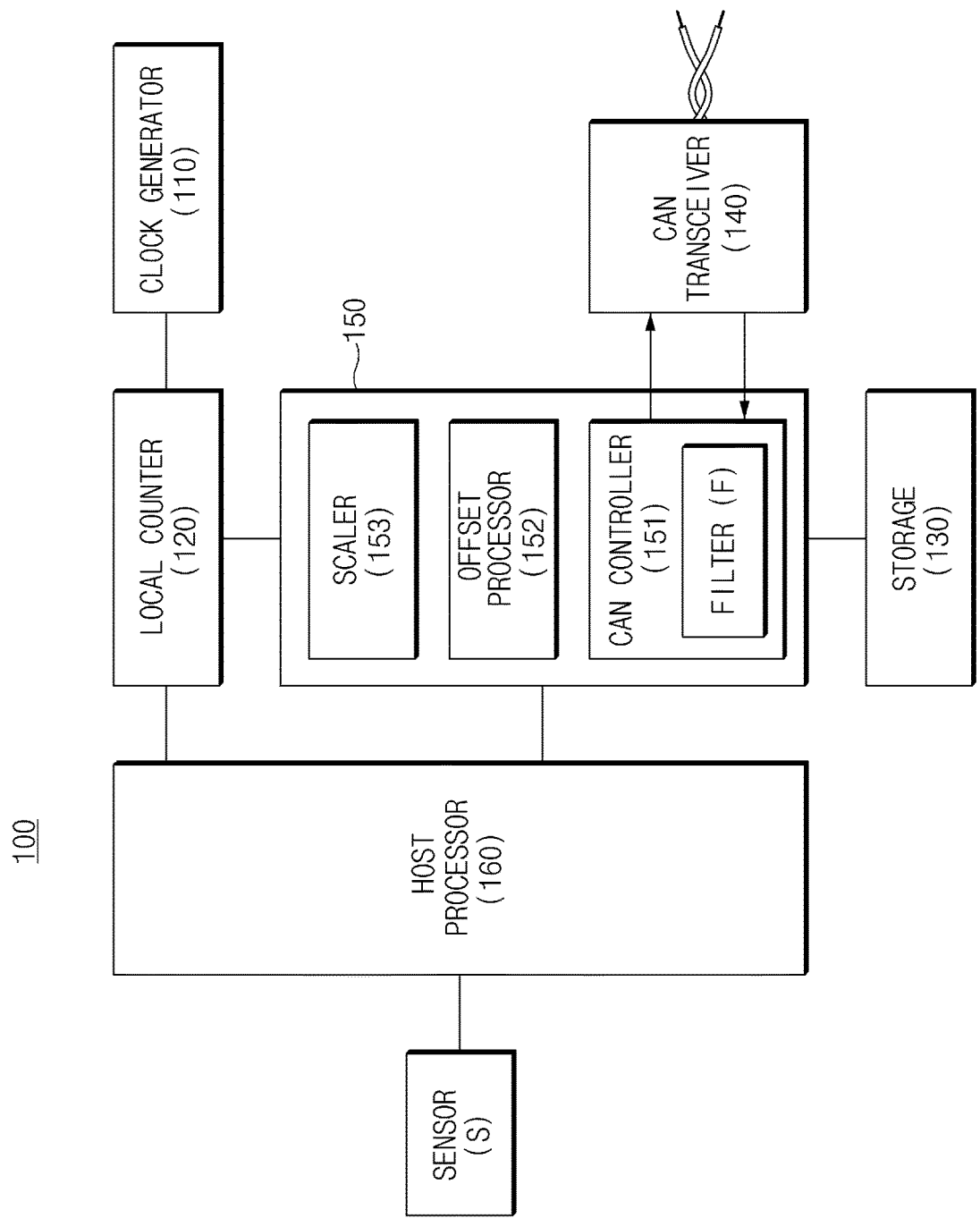
FIG. 2 is a block diagram illustrating an in-vehicle communication device according to an embodiment of the present disclosure.

FIG. 2 is a block diagram illustrating the in-vehicle communication device according to an embodiment of the present disclosure.

Referring to FIG. 2, the in-vehicle communication device (hereinafter, the communication device) 100 includes a clock generator 110, a local counter 120, a storage 130, a CAN transceiver 140, a processor 150, and a host processor 160.

The clock generator 110 generates a clock signal (clock pulse). The clock signal is time information for controlling timing at which the host processor 160 operates, and is referred to as a synchronization signal, a timing signal, or the like.

The local counter 120 counts pulses of the clock signal output from the clock generator 110 to output a count value. For example, the local counter 120 counts the number of pulses per second of the clock pulse output from the clock generator 110 to output the counted number of pulses. The count value output from the local counter 120 is used to provide absolute time information.

A driving frequency and the number of counter bits of the local counter 120 should be determined based on a time accuracy unit (ms or us) required for the CAN communication. For example, the driving frequency of equal to or greater than 1 KHz and the number of counter bits capable of expressing "year, month, day, hour, minute, second, and ms" are required to ensure 1 ms time accuracy in the CAN communication.

The storage 130 may store the driving frequency (operation frequency) of the local counter 120, communication delay information (i.e., CAN communication delay offset information), and/or a synchronization message identifier (MSG ID). The driving frequency, the communication delay information, the synchronization message identifier, and the like may be set by a user. In this connection, the communication delay information may include statistical average delay time (including synchronization message transmission delay, delay due to time synchronization processing, and the like) for the CAN communication. The communication delay information includes an optimal communication delay time set by actually measuring a communication delay time of the communication device 100 based on an internal configuration of the vehicle and considering a future variability. The synchronization message identifier may be set to minimize a value of a message identifier to raise a priority of a synchronization message. The storage 130 may be implemented as at least one of storage media (recording media) such as a flash memory, a hard disk, a secure digital (SD) card, a removable disk, web storage, and/or the like.

The CAN transceiver (hereinafter referred to as a transceiver) 140 may transmit or receive a message via the CAN bus. In other words, the transceiver 140 transmits a message received from the processor 150 via the CAN bus or transfers a message received through the CAN bus to the processor 150.

The processor 150 receives a message (that is, a synchronization message) for time synchronization via the transceiver 140, and corrects the count value of the local counter 120 based on synchronization information included in the received synchronization message to perform the time synchronization. The processor 150 automatically performs the time synchronization operation each time the synchronization message is received. The processor 150 may be implemented as at least one of an application specific integrated circuit (ASIC), a digital signal processor (DSP), programmable logic devices (PLD), field programmable gate arrays (FPGAs), central processing units (CPUs), microcontrollers, and/or microprocessors. The processor 150 may be equipped with a memory (not shown). The memory (not shown) may store software programmed to allow the processor 150 to perform a predetermined operation. Such memory (not shown) may be implemented as at least one of storage media such as a random access memory (RAM), a static random access memory (SRAM), a read only memory (ROM), a programmable read only memory (PROM), an electrically erasable and programmable ROM (EEPEROM), an erasable and programmable ROM (EPROM), a register, and/or the like.

The processor 150 includes a CAN controller 151, an offset processor 152, and a scaler 153.

The CAN controller 151 may receive or transmit the message via the CAN transceiver 140. When the message is received via the CAN transceiver 140, the CAN controller 151 determines whether the message received through a filter "F" (received message) is the synchronization message. The filter "F" identifies a message identifier MSG ID of the received message and selects the synchronization message among the received messages. In other words, the filter "F" compares the message identifier of the received message with a synchronization message identifier previously stored in the storage 130, and when the two message identifiers match with each other, recognizes the received message as the synchronization message. On the other hand, the filter "F" recognizes the received message as a normal message when the two message identifiers do not match with each other.

The CAN controller 151 extracts synchronization time information from the received message when the received message is identified as the synchronization message. That is, the CAN controller 151 extracts a synchronization time from the synchronization message.

The offset processor 152 offsets the synchronization time information by reflecting communication delay information (that is, communication delay time) in the extracted synchronization time information (synchronization information). For example, when the communication delay time is 1 ms (=1000 us), the offset processor 152 may add the extracted synchronization time and the communication delay time to calculate offset synchronization time (=synchronization time+1000 us).

The scaler 153 scales the synchronization time that is offset based on the driving frequency of the local counter 120. In other words, the scaler 153 scales the offset synchronization time into the count value in consideration of the driving frequency of the local counter 120. For example, when the unit of the offset synchronization time is 1 us and the driving frequency of the local counter 120 is 32 KHz, the scaler 153 calculates a scaled count value (=(offset synchronization time×32000 Hz)/1000000) using the offset synchronization time and the driving frequency. The scaler 153 reflects the scaled count value to the local counter 120. That is, the local counter 120 updates the current count value into the scaled count value.

The host processor 160 performs a specific function (e.g., a sensing function) assigned to the communication device 100. The host processor 160 may be implemented as at least one of an ASIC, a central processing unit (CPU), a microcontroller, and/or a microprocessor.

The host processor 160 converts the count value output from the local counter 120, that is, the number of pulses per second into time information (e.g., year, month, day, hour, minute, and second). In this connection, the time information means synchronized time. The host processor 160 may include a converter (not shown) for converting the count value into the time information.

The host processor 160 may acquire the sensor information through a sensor "S". In this connection, the sensor information means data measured (sensed) by the sensor "S", that is, sensor data. When the sensor information output from the sensor "S" is acquired, the host processor 160 identifies the time (acquisition time) at which the sensor information is acquired. The host processor 160 obtains a synchronized time based on the count value output from the local counter 120 as the acquisition time.

When the host processor 160 is desired to transmit the sensor information to another in-vehicle device, the host processor 160 generates a transmission message including the sensor information and the acquisition time (i.e., the synchronized time). The host processor 160 transmits the generated transmission message to the CAN controller 151. The CAN controller 151 may transmit the transmission message via the CAN transceiver 140.

Figure 3:
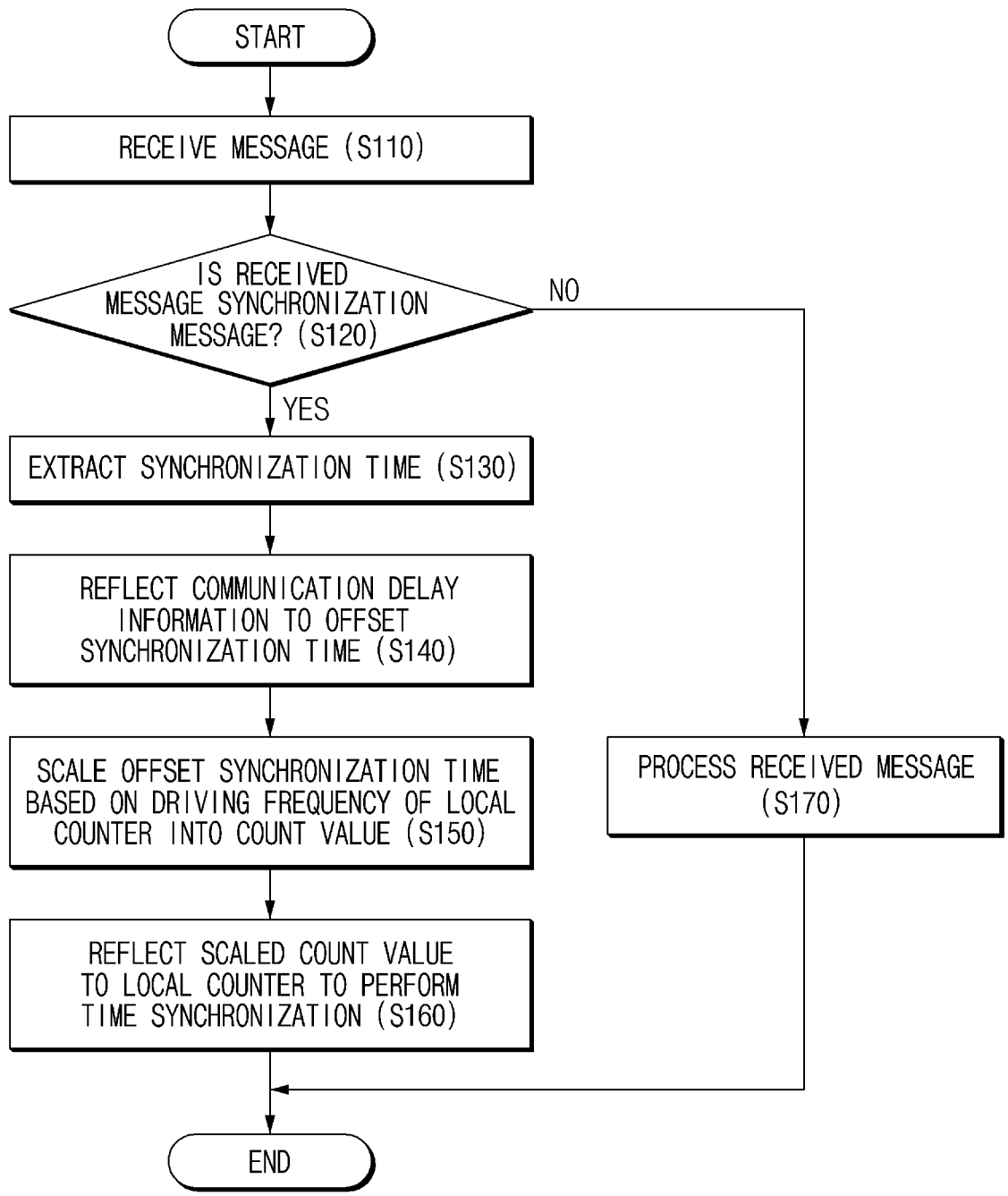
FIG. 3 is a flowchart illustrating a time synchronization method of a communication device according to an embodiment of the present disclosure.

FIG. 3 is a flowchart illustrating a time synchronization method of a communication device according to an embodiment of the present disclosure.

Referring to FIG. 3, the processor 150 receives the message via the CAN transceiver 140 (S110). That is, the processor 150 receives the message via the CAN communication.

The processor 150 determines whether the received message is the synchronization message (S120). The processor 150 determines whether the message identifier of the received message and the synchronization message identifier previously stored in the storage 130 match with each other. When the two message identifiers match with each other, the processor 150 determines the received message as the synchronization message. On the other hand, when the two message identifiers do not match with each other, the processor 150 determines the received message as the general message.

When it is identified that the received message is the synchronization message in S120, the processor 150 extracts the synchronization time information from the received message (S130). The processor 150 extracts the synchronization time included in the synchronization message.

The processor 150 reflects the communication delay information to the extracted synchronization time information to offset the extracted synchronization time information (S140). For example, when the communication delay information is 1 ms, the processor 150 adds the extracted synchronization time and the communication delay information 1 ms (=1000 us) to calculate the offset synchronization time.

The processor 150 scales the offset synchronization time based on the driving frequency of the local counter 120 (S150). The processor 150 converts the offset synchronization time into the count value in consideration of the driving frequency of the local counter 120. For example, when the unit of the offset synchronization time is 1 us and the driving frequency of the local counter 120 is 32 KHz, the processor 150 calculates the scaled count value (=(offset synchronization time×32000 Hz)/1000000) using the offset synchronization time and the driving frequency.

The processor 150 reflects the scaled count value to the local counter 120 to perform the time synchronization (S160). The processor 150 updates the current count value of the local counter 120 into the scaled count value.

Thereafter, the host processor 160 acquires the sensor information through the sensor "S", identifies the synchronized time information as the acquisition time of the sensor information, and generates the transmission message using the sensor information and the acquisition time and transmits the generated transmission message.

On the other hand, when the received message is the general message in S120, the processor 150 processes the received message based on a predetermined procedure (S170). For example, when the received message is the general message, the processor 150 bypasses the received message to the host processor 160.

Figure 4:
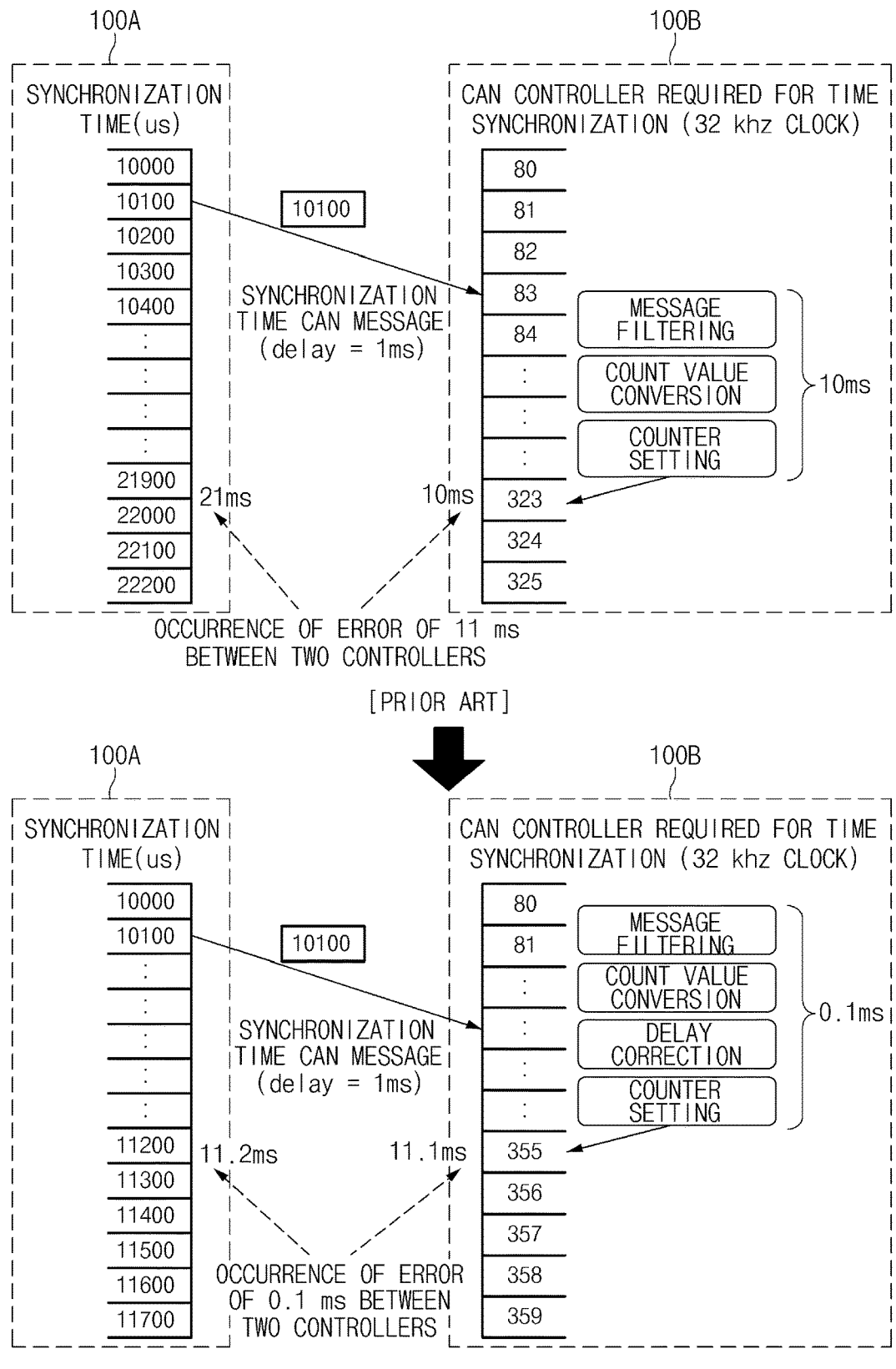
FIG. 4 is a view for comparing errors based on time synchronization according to an embodiment of the present disclosure and conventional time synchronization with each other.

FIG. 4 is a view for comparing errors based on time synchronization according to an embodiment of the present disclosure and conventional time synchronization with each other.

As shown in FIG. 4, when a first CAN controller of a first communication device 100A, which has a reference time for time synchronization, does not need separately time synchronization, and a second CAN controller of a second communication device 100B needs the time synchronization with the reference time of the first communication device 100A, the first CAN controller may transmit a synchronization message including a synchronization time (reference time) to the second CAN controller. In the past, a delay time of 10 ms occurred as the time synchronization was performed in a software manner, and a time error may be large due to an uncertainty of a software execution time. However, the present disclosure performs the time synchronization in a hardware manner, thereby reducing the delay time due to the time synchronization to 0.1 ms, and the uncertainty of a hardware execution time is small so that the time error may be much smaller.

The description above is merely illustrative of the technical idea of the present disclosure, and various modifications and changes may be made by those skilled in the art without departing from the essential characteristics of the present disclosure. Therefore, the embodiments disclosed in the present disclosure are not intended to limit the technical idea of the present disclosure but to illustrate the present disclosure, and the scope of the technical idea of the present disclosure is not limited by the embodiments. The scope of the present disclosure should be construed as being covered by the scope of the appended claims, and all technical ideas falling within the scope of the claims should be construed as being included in the scope of the present disclosure.

According to the present disclosure, the hardware-based time synchronization is performed, so that a time accuracy of the sensor information is improved, thereby improving a performance of the sensor integrated electronic control unit, such as ADAS and the like.

Furthermore, according to the present disclosure, modeling for the time synchronization is optimized using the synchronization message identifier, the driving frequency of the local counter, and the communication delay offset value, thereby reducing a cost of implementing the time synchronization function.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

The invention claimed is:

1. An in-vehicle communication device comprising:
a clock generator for generating a clock signal;
a local counter for counting the number of pulses of the clock signal;
a transceiver for receiving a message via an in-vehicle communication network, wherein the in-vehicle communication network is implemented as a controller area network (CAN) or a Local Interconnect Network (LIN); and
a processor configured to:
  determine whether the message received via the transceiver is a synchronization message;
  extract synchronization time information from the synchronization message; and
  adjust a count value of the local counter based on the synchronization time information to perform time synchronization;
  wherein the processor offsets the synchronization time information by reflecting communication delay information, and scales the offset synchronization time based on a driving frequency of the local counter;
  wherein the processor includes a CAN controller, an offset processor, and a scaler; and
  wherein the processor calculates an offset synchronization time by adding a synchronization time and a communication delay time.

2. The in-vehicle communication device of claim 1, wherein the CAN controller filters the synchronization message among the received message through a filter.

3. The in-vehicle communication device of claim 2, wherein the filter determines whether a message identifier of the received message matches a pre-stored synchronization message identifier.

4. The in-vehicle communication device of claim 1, wherein the scaler calculates a scaled count value by performing a multiplication operation of the offset synchronization time and the driving frequency.

5. The in-vehicle communication device of claim 4, wherein the scaler reflects the scaled count value to the local counter.

6. The in-vehicle communication device of claim 5, wherein the local counter updates a current count value into the scaled count value.

7. The in-vehicle communication device of claim 1, further comprising:
   at least one sensor; and
   a host processor configured to:
      when sensor information is acquired through the at least one sensor, identify acquisition time information of the sensor information based on a synchronized count value output from the local counter; and
      generate a transmission message including the sensor information and the acquisition time information and provide the generated transmission message to the processor.

8. A method for synchronizing time of an in-vehicle communication device, the method comprising:
   receiving, by a processor, a message via an in-vehicle communication network, wherein the in-vehicle communication network is implemented as a controller area network (CAN) or a Local Interconnect Network (LIN);
   determining, by the processor, whether the received message is a synchronization message;
   extracting, by the processor, synchronization time information from the synchronization message; and
   performing, by the processor, time synchronization based on the synchronization time information;
   wherein the performing of the time synchronization includes:
      offsetting, by an offset processor of the processor, the synchronization time information by reflecting communication delay information; and
      scaling, by the processor, the offset synchronization time information based on a driving frequency of a local counter;
   wherein the offsetting of the synchronization time information includes:
      calculating, by the offset processor, an offset synchronization time by adding a synchronization time and a communication delay time;
   wherein the determining of whether the received message is the synchronization message includes:
      determining, by a CAN controller of the processor, whether a message identifier of the received message matches a pre-stored synchronization message identifier and filtering the synchronization message among the received messages; and
   wherein the performing of the time synchronization includes:
      reflecting, by the scaler, a scaled count value to the local counter.

9. The method of claim 8, wherein the scaling of the offset synchronization time information includes:
   calculating, by the scaler, a scaled count value by performing a multiplication operation of the offset synchronization time and the driving frequency.

10. The method of claim 8, wherein the reflecting of the scaled count value to the local counter includes:
   updating, by the local counter, a current count value into the scaled count value.

* * * * *